United States Patent
Fujii et al.

(10) Patent No.: US 6,884,305 B1
(45) Date of Patent: Apr. 26, 2005

(54) HIGH-STRENGTH α+β TYPE TITANIUM ALLOY TUBE AND PRODUCTION METHOD THEREFOR

(75) Inventors: Hideki Fujii, Futtsu (JP); Masatoshi Murayama, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 09/807,468

(22) PCT Filed: Jul. 4, 2000

(86) PCT No.: PCT/JP00/04423

§ 371 (c)(1),
(2), (4) Date: Apr. 11, 2001

(87) PCT Pub. No.: WO01/12375

PCT Pub. Date: Feb. 22, 2001

(30) Foreign Application Priority Data

Aug. 12, 1999 (JP) .......................................... 11-228630

(51) Int. Cl.$^7$ ............................. C22C 14/00; C22F 1/18
(52) U.S. Cl. ........................ 148/521; 148/421; 228/145
(58) Field of Search ................................. 148/519, 520; 228/145, 150, 173.4; 219/128.45, 128.46

(56) References Cited

U.S. PATENT DOCUMENTS

| | | | | |
|---|---|---|---|---|
| 4,859,415 A | * | 8/1989 | Shida et al. .................. | 420/417 |
| 4,991,419 A | * | 2/1991 | Kuroda et al. ................. | 72/97 |
| 5,226,981 A | * | 7/1993 | Meredith et al. ........... | 148/520 |

FOREIGN PATENT DOCUMENTS

| | | |
|---|---|---|
| DE | 40 19 117 A1 | 12/1991 |
| EP | 466606 | 1/1992 |
| EP | 0 748 876 A1 | 12/1996 |
| JP | 63-149077 | 6/1988 |
| JP | 9-78164 | 3/1997 |
| JP | 11-114684 | 4/1999 |

OTHER PUBLICATIONS

Database WPI Section Ch, Week 199722, Derwent Publications Ltd., London, GB; AN 1997–242077 XP–002223594.

* cited by examiner

Primary Examiner—George Wyszomierski
(74) Attorney, Agent, or Firm—Kenyon & Kenyon

(57) ABSTRACT

The present invention provides a high strength α+β titanium alloy pipe not requiring a large amount of cutting and enabling full use to be made of the features of titanium alloy of light weight and high strength and a method for production of the same. Specifically, a high strength α+β titanium alloy pipe having an outside diameter of at least 150 mm and a wall thickness of at least 6 mm, the α+β titanium alloy pipe characterized by having a welded seam running in the longitudinal direction of pipe at one location and by having a ratio of the minimum wall thickness to the maximum wall thickness of the portions excluding the weld zone of 0.95 to 0.99. Also, a method of production of a high strength α+β titanium alloy pipe comprising cold forming a high strength α+β titanium alloy plate of a wall thickness of at least 6 mm into a tubular shape by the U-O method or press-bending method and welding together the abutted plate edges.

18 Claims, No Drawings

HIGH-STRENGTH α+β TYPE TITANIUM ALLOY TUBE AND PRODUCTION METHOD THEREFOR

TECHNICAL FIELD

The present invention relates to a pipe comprised of high strength α+β titanium alloy, in particular a welded pipe, and a method of production of the same.

BACKGROUND ART

Titanium alloy has a light weight, high strength, and high corrosion resistance, so has been taken note of as a material best suited to extreme environments of large depths, high temperatures, high pressures, and high corrosion in geothermal development, deep ocean floor oil field and gas field development, etc. In particular, α+β titanium alloy, which is frequently used for aircraft applications and boasts a good record, and high corrosion resistance α+β titanium alloy, in which a small amount of Pd or Ru of about 0.01 to 0.3% is added to improve the corrosion resistance, are considered promising as particularly superior materials for extreme environments. In such applications, pipes are the main product form.

In the past, as the methods for production of α+β titanium alloy pipes, there have been the following A to D:

A: The method of hot extrusion (seamless pipe),

B: The method of using a plug mill etc. for continuously piercing, elongating, sizing, drawing, and other rolling to form pipes (seamless pipe), C: The method of cold forming thick plate by the method of rolling known as roll bending and welding together the abutted plate ends (welded pipe), and D: The method of hot or warm press forming thick plate to a semicircular sectional shape and welding together two of these (welded pipe).

Among these, the method of C is not used much at all for the production of titanium alloy pipe since circularity of the pipe is difficult to secure, long pipes are difficult to obtain, etc. Further, the method of D requires heating the material for the hot or warm forming. Further, welding is required at two locations, so the overall cost becomes high. This method is therefore also seldom used.

On the other hand, the methods of A and B have the advantages of enabling production of seamless pipe without weld zones where deterioration of the characteristics is feared. Use is mainly made of titanium alloy pipes produced by these methods.

Titanium alloy pipes made by these methods, however, often have deep flaws or defects at the inside and outside surfaces. A considerable amount of machining is required to remove these flaws or defects. Titanium alloy, however, has an extremely poor machinability. There was therefore the problem that this large amount of machining led to a major increase in cost.

Further, pipes produced by these methods had the problems of a large unevenness of wall thickness and therefore was easily formed with portions of extreme thickness and portions of thinness of the pipe. That is, since it was necessary to design the strength for the wall thickness of the thinnest portion, the material of the portions thicker than that was wastefully used. Not only did the cost become high, but also there was the problem that the characteristics of titanium alloy, i.e., the light weight, could not be sufficiently manifested. Of course, it is possible to even out the wall thickness by machining, but as explained above, titanium alloy is a material with an extremely poor machinability and the cost ends up increasing tremendously. Therefore, it was de facto difficult to eliminate the large unevenness of wall thickness.

DISCLOSURE OF THE INVENTION

An object of the present invention is to provide a high strength α+β titanium alloy pipe which does not require a large amount of machining leading to a large increase in cost and can make sufficient use of the characteristics of titanium alloy of light weight and high strength. Another object of the present invention is to provide a method for production of such a titanium alloy pipe at a low cost.

To achieve the above objects, the present invention provides the following (1) to (13):

(1) A high strength α+β titanium alloy pipe having an outside diameter of at least 150 mm and a wall thickness of at least 6 mm, the α+β titanium alloy pipe characterized by having a welded seam running in the longitudinal direction of pipe at one location and by having a ratio of the minimum wall thickness to the maximum wall thickness of the portions excluding the weld zone of 0.95 to 0.99.

(2) A high strength α+titanium alloy pipe as set forth in (1), wherein the high strength α+β titanium alloy contains by wt % Al: 2.5 to 3.5% and V: 2.0 to 3.0% and the balance of Ti and unavoidable impurities.

(3) A high strength α+β titanium alloy pipe as set forth in (2), wherein the high strength α+β titanium alloy further contains by wt % at least one of Pd and Ru: 0.01 to 0.5% in total.

(4) A high strength α+β titanium alloy pipe as set forth in (1), wherein the high strength α+β titanium alloy contains by wt % Al: 5.5 to 6.75% and V: 3.5 to 4.5% and the balance of Ti and unavoidable impurities.

(5) A high strength α+β titanium alloy pipe as set forth in (4), wherein the high strength α+β titanium alloy further contains by wt % at least one of Pd and Ru: 0.01 to 0.5% in total.

(6) A high strength α+β titanium alloy pipe as set forth in any one of (1) to (5), wherein the pipe as a whole is comprised of a β-annealed structure.

(7) A method of production of a high strength α+β titanium alloy pipe set forth in (1) to (6) characterized by cold forming a high strength α+β titanium alloy plate of a thickness of at least 6 mm into a tubular shape by a U-O method or press-bending method and welding together the abutted plate edges.

(8) A method of production of a high strength a+titanium alloy pipe as set forth in (7) characterized by welding together the abutted plate edges by a keyhole plasma welding method and further, if necessary, overlaying by plasma welding or TIG welding using a welding filler.

(9) A method of production of a high strength α+β titanium alloy pipe as set forth in (7) or (8), characterized by arranging the tubular shaped member so that the abutted plate edges come to the top and welding from the top of the outside of the tubular shaped member.

(10) A method of production of a high strength α+β titanium alloy pipe as set forth in (7) or (8), characterized by arranging the tubular shaped member so that the abutted plate edges come to the bottom and welding from the top of the inside of the tubular shaped member.

(11) A method of production of a high strength α+β titanium alloy pipe as set forth in any one of (7) to (10), characterized in that part or all of a pilot gas and shield gas used for the welding is helium gas.

(12) A method of production of a high strength α+β titanium alloy pipe as set forth in any one of (7) to (11), wherein the high strength α+β titanium alloy plate of a thickness of at least 6 mm is a high strength α+β titanium alloy plate which is worked to a reduction of at least 50% in a temperature region of not more than a β-transus temperature and is annealed in a temperature region of not more than the β-transus temperature.

(13) A method of production of a high strength α+β titanium alloy pipe as set forth in (7) to (12), characterized by performing a series of heat treatments comprising heating the welded pipe to at least the β-transus temperature and cooling it at a cooling rate of at least air cooling, further heating it to 650° C. to 850° C., holding it there for at least 30 minutes, and cooling at a cooling rate of not more than air cooling, and heating it to 450 to 650° C., holding it there for at least 2 hours, and cooling it at a cooling rate of not more than air cooling.

BEST MODE FOR WORKING THE INVENTION

The inventors conducted a further study of so-called welded pipes, that is, pipes formed by bending thick and medium plates and welding the plate ends together, to eliminate the problems in the above α+β titanium alloy seamless pipes and as a result discovered a high strength α+β titanium alloy pipe and method of production thereof not requiring a large amount of machining leading to a large increase in cost.

That is, the aspect of the invention described in (1) provides a high strength α+β titanium alloy pipe having an outside diameter of at least 150 mm and a wall thickness of at least 6 mm, the α+β titanium alloy pipe characterized by having a welded seam running in the longitudinal direction of the pipe at one location and by having a ratio of the minimum wall thickness and maximum wall thickness of the portions excluding the weld zone of 0.95 to 0.99.

The reason for covering a high strength α+β titanium alloy pipe having an outside diameter of at least 150 mm and a wall thickness of at least 6 mm is as follows. That is, regarding a pipe of a smaller diameter or wall thickness than this, a seamless titanium alloy pipe with less unevenness of wall thickness can be produced by forming a seamless pipe by hot extrusion and then drawing or otherwise cold working the seamless pipe in the longitudinal direction thereof. In this case, considerable machining is required to remove the flaws in the outside surface, but from the viewpoint of unevenness of wall thickness, a pipe of a relatively even wall thickness can be obtained even without going to the trouble of applying the present invention.

Further, the present invention is a welded pipe and inevitably includes a weld zone, but from the viewpoint of deterioration of the characteristics and manufacturing cost, the welded seam is provided at the minimum necessary single location. The pipe described in (1) has a ratio of the minimum wall thickness and the maximum wall thickness of the portions other than the weld zone in the range of 0.95 to 0.99. A pipe with an unevenness of wall thickness having a value lower than 0.95 can be achieved by production under careful operating conditions even in a seamless pipe. Further, in the same way as the case of a seamless pipe, either high cost machining is performed to correct the unevenness of wall thickness or the excess thick wall portion is left as it is and a pipe heavier than desired is used as it is and therefore the effect of the present invention cannot be sufficiently exhibited.

On the other hand, a pipe with a small unevenness of wall thickness where the ratio of the minimum wall thickness and maximum wall thickness of the portions other than the weld zone exceeds 0.99 cannot be produced without precision machining and ends up becoming high in cost.

In the present invention, there is a single weld zone. The ratio of that portion in the pipe as a whole is slight. Therefore, the increase in weight due to the increase in wall thickness accompanying the excess material of the weld zone is slight judged from the pipe as a whole.

Due to the above reasons, in the invention (1), the ratio of the minimum wall thickness to the maximum wall thickness, an indicator of the unevenness of wall thickness, is in the range of 0.95 to 0.99 except for the weld zone.

The high strength α+β titanium alloy covered by the present invention includes various types of alloys having two main phases, an α-phase and a β-phase, in the equilibrium state at room temperature and undergoing martensite transformation during cooling when quenched from a temperature of at least the β-transus temperature. Ti-3Al-2.5V, Ti-6Al-4V, T-6A1-4V ELI, Ti-1 to 1.5% Fe-0.2 to 0.6% oxygen-0.01 to 0.05% nitrogen, Ti-4.5Al-3V-2Mo-2Fe, etc. correspond to this. Here, ELI (extra low interstitials) means an alloy reduced in interstitial type impurity elements such as oxygen, nitrogen, and carbon.

Further, in the present invention, especially when for use under extreme environments, a small amount of 0.01 to 0.5% or so of Pd or Ru is added to improve the corrosion resistance. These Pd- and Ru-added alloys also fall under high strength α+β titanium alloys. Among these, the particularly general use alloys are Ti-3Al-2.5V, Ti-6Al-4V, and Ti-6Al-4V ELI. Further, when for use under tough environments such as for oil or natural gas riser pipes or line pipes or casings in geothermal power generation plants, alloys further including small amounts of Pd or Ru are used. That is, if the present invention is applied to these alloys, the advantages of the present invention can be extremely effectively obtained.

The invention (2), for the above reasons, is an alloy containing by weight percent 2.5 to 3.5% of Al and 2.0 to 3.0% of V, that is, an alloy normally called "Ti-3Al-2.5V" in the ASTM standard etc., applied to the present invention described in (1). The invention (3) is this plus by weight percent a total amount of 0.01 to 0.5% of Pd or Ru to which the present invention is applied.

Further, the invention (4), for similar reasons, is an alloy containing by weight percent 5.5 to 6.75% of Al and 3.5 to 4.5% of V, that is, an alloy normally called "Ti-6Al-4V" in the ASTM standard etc., to which the present invention (1) is applied. The invention (5) is this plus by weight percent a total amount of 0.01 to 0.5% of Pd or Ru to which the present invention is applied.

The invention (6) is a high strength α+βtitanium alloy pipe as set forth in any one of (1) to (5), wherein the pipe as a whole is comprised of a β-annealed structure. A β-annealed structure, is a structure comprised of an intergranular α-phase precipitated on the β-grain boundaries and acicular α-phase formed in the β-grains and is characterized by a high fracture toughness compared with an equiaxed structure. The invention (6) exhibits an effect on applications where a particularly high fracture toughness is desired.

A β-annealed structure has the defect of a poor ductility compared with an equiaxed structure. Therefore, when producing a pipe of the invention (6), as shown by the method described in (13), a plate material superior in ductility is preferably cold formed by the U-O method or press bending method etc. and finally heat treated so as to convert it to a β-annealed structure. Further, it is preferable to remove the residual strain, which augments low ductility, as much as possible as well.

The high strength α+β titanium alloy pipe of the present invention described in any one of (1) to (6) may be produced by the method of any one of (7) to (13).

In the invention (7), first, a high strength α+β titanium alloy plate of a thickness of at least 6 mm is cold formed into a tubular shape by the U-O method or press-bending method. The reason why the thickness of the plate was made at least 6 mm is to secure a wall thickness defined by (1) to (6). The width of the plate should be suitably set considering the diameter of the pipe after forming.

To simplify the welding of the next step, it is preferable to suitably prepare the edges for the grooves before the forming.

The reasons for forming into a tubular shape by the U-O method or press bending method are as follows:

There are the following methods A to D for cold forming a plate into a tubular shape:

A. The roll forming method for forming a plate into a tubular shape using caliber rolls (in general, comprised of multiple stands) arranged perpendicularly with the plate surface;

B. The roll bending method for forming a plate into a tubular shape using horizontal rolls (in general passing between three rolls) arranged parallel to the plate surface;

C. The U-O method for forming a plate into a tubular shape by press bending a plate in a U-shape and further pressing it into an O-shape;

D. The press bending method for forming strictly speaking a multiangular pipe by press bending a side edge of a plate along the length direction and successively advancing this process toward the center of the plate width.

In C and D, to obtain a pipe with a high circularity, it is also possible to strongly bend the side edges of the plate in advance, cut away this portion after forming to a tubular shape, and finally press to a circular pipe shape.

The inventors engaged in a detailed analysis and study of the effects of the forms of deformation, strain rates, and working methods on the plastic deformability of α+β titanium alloys. As a result, a high strength α+β titanium alloy having a high strength, a low ductility, a low Young's modulus, and a large springback cannot be sufficiently cold worked by the roll forming method of A or the roll bending method of B. Fractures occur or circularity cannot be secured. The inventor discovered however that by using the U-O method of C or the press bending method of D, it is possible to work a plate into a tubular shape and obtain a good state of abutment of the plate ends. The present invention was completed based on this discovery.

After the cold forming step using the U-O method or the press bending method, the abutted plate edges are welded together to form the pipe. If the U-O method or the press bending method is used to cold form a high strength α+β titanium alloy, the plate edges are abutted well and a pipe can be produced by only welding the abutted single portion. For the welding of a titanium material, generally use is made of TIG welding, plasma welding, MIG welding, and electron beam welding. In the present invention as well, it is possible to use these welding methods alone or in combination. In electron beam welding, in recent years reduced pressure electron beam welding methods which do not require large sized high vacuum chambers and enable welding with a simplified shielding have been developed. These methods can also be applied.

The welded pipe, if necessary, is then subjected to heat treatment, adjustment of pipe configuration, and surface finishing. If the heat treatment is comprised of several steps, the pipe configuration adjustment can be performed between these heat treatment steps to successively adjust the shape. When the residual strain is not a problem, it is also possible to perform final pipe configuration adjustment after the heat treatment. The surface finishing can be performed by light machining, grinding, or pickling to an extent not greatly increasing the cost. It is recommended to use shot blasting or sand blasting, followed by pickling, since it is low in cost and simple.

The invention (8) is a method of production as set forth in (7) characterized by welding together the abutted plate edges by a keyhole plasma welding method and further, if necessary, overlaying by plasma welding or TIG welding using a welding filler. Here, "keyhole plasma welding" is a type of plasma welding where welding is performed by moving a beam while passing a flow of plasma gas through it. As explained earlier, there are several methods for welding titanium alloy, but TIG welding is used most frequently. The pipes of (1) to (6) can also be welded by TIG welding.

When producing a pipe with a particularly large wall thickness, with TIG welding, the number of welding passes becomes tremendous and efficiency is extremely poor. In such a case, it is effective to use the keyhole plasma welding method. The keyhole plasma welding method enables titanium alloy plate of a thickness of up to about 20 mm to be welded by a single pass even without use of a welding filler. Simultaneously, it has the advantage of resistance to generation of weld defects. It does however have the defect of susceptibility to undercut or a reduction of wall thickness at the top. Therefore, when such undercut occurs, overlaying must be performed by plasma welding or TIG welding using a welding filler to compensate for this.

When producing a pipe having a wall thickness of at least 20 mm, it is not possible to weld the entire wall thickness by just keyhole plasma welding, so in addition to this it is necessary to overlay by plasma welding or TIG welding using a welding filler to compensate for this. Note that before the keyhole plasma welding, if the abutted plate edges are tack welded by TIG welding etc., the keyhole welding can be performed stably.

The invention (9) is a method of production as set forth in (7) or (8), characterized by arranging the tubular shaped member so that the abutted plate edges come to the top and welding from the top of the outside of the tubular shaped member. If welding by such an arrangement, since the force of gravity acting on the melted portion and the direction of solidification are parallel, weld defects such as pores which cause deterioration of the mechanical properties, in particular the fatigue characteristics, are kept from arising at the weld zone.

The invention (10) is a method of production as set forth in (7) or (8), characterized by arranging the tubular shaped member so that the abutted plate edges come at the bottom and welding from the top of the inside of the tubular shaped member. If welding by such an arrangement, in the same way as the case of (9), since the force of gravity acting on the melted portion and the direction of solidification are parallel, weld defects such as pores which cause deterioration of the mechanical properties, in particular the fatigue characteristics, are kept from arising at the weld zone. Further, since the initial welding pass, where weld defects do not easily occur, is at the outside of the pipe, it is possible to reduce the defects at the outside of the pipe, which often cause the occurrence of fatigue cracks, and to further improve the fatigue characteristics.

The invention (11) is a method of production as set forth in (7) to (10), characterized in that part or all of a pilot gas and shield gas used for the welding is helium gas. In general, in welding of a titanium material by TIG welding, plasma welding, MIG welding, etc., argon gas is used as the inert gas for the shield gas or pilot gas. In the invention (11), helium gas is used instead of part or all of the argon gas. The first reason is that helium gas is more easily converted to plasma than argon. The increase in the input heat efficiency is utilized to improve the welding efficiency. The second reason is that with helium rather than argon, the gas entrained in the melted portion more easily escapes to the outside. As a result, it is possible to greatly reduce the porosity and other weld defects causing a deterioration of the fatigue characteristics and thereby improve the quality.

The above effect relates to only the weld zone, so even if not all of the shield gas is made helium, the effect can be achieved by using helium gas only for the portion where the arc occurs. For example, in the case of TIG welding, the above effect can be achieved by using helium gas as only the torch gas and using argon gas as the shield gas around the weld zone. Depending on the flow rate of the gas or the geometrical conditions of the weld zone, the gas is sometimes entrained from elsewhere at the arc portion. In such a case, it is better to use helium gas as the entire shield gas.

The invention (12) is a method of production as set forth in any one of (7) to (11), wherein as the high strength $\alpha+\beta$ titanium alloy plate of a thickness of at least 6 mm, use is made of one worked to a rolling reduction of at least 50% in a temperature region of not more than a $\beta$-transus temperature and annealed in a temperature region of not more than the $\beta$-transus temperature. When an $\alpha+\beta$ titanium alloy is worked at a rolling reduction of at least 50% in a temperature region of not more than a $\beta$-transus temperature and is annealed in a temperature region of not more than the $\beta$-transus temperature, it becomes an equiaxed structure or an elongated structure called a mill annealed structure with a good ductility. By using this titanium alloy plate, it is easy to improve the cold formability and to facilitate cold forming. If the reduction under the $\beta$-transus temperature is less than 50% and the annealing temperature is over the $\beta$-transus temperature, an acicular structure poor in ductility is developed, so sometimes cracks occur during the forming under stricter conditions such as a small outside diameter of the pipe.

The invention (13) is one method of production of a high strength $\alpha+\beta$ titanium alloy pipe as set forth in (6). It is possible to produce an $\alpha+\beta$ titanium alloy pipe provided with both a high fatigue strength and high ductility in addition to a high fracture toughness. That is, it comprises subjecting the pipe produced by the method of production set forth in any one of (7) to (12) to a series of heat treatments comprising heating to at least the $\beta$-transus temperature and cooling at a cooling rate of at least air cooling, further heating to 650° C. to 850° C., holding it there for at least 30 minutes, and cooling at a cooling rate of not more than air cooling, and heating to 450 to 650° C., holding it there for at least 2 hours, and cooling at a cooling rate of not more than air cooling.

Here, the first step of the heat treatment, the heating to at least the $\beta$-transus temperature and cooling at a cooling rate of at least air cooling, is a step of heating to at least the $\beta$-transus temperature to convert the entire pipe to a $\beta$-type single phase once and the cooling at a cooling rate of at least air cooling to obtain a relatively fine grain boundary $\alpha$-phase and acicular $\alpha$-phase structure, that is, a $\beta$-annealed structure, without forming a coarse intergranular $\alpha$-phase worsening the fatigue characteristic. Here, if not heating to a temperature above the $\beta$-transus temperature, the entire pipe will not become a $\beta$-type single phase, an $\alpha$-phase will remain, and a complete $\beta$-annealed structure cannot be obtained. Further, if cooling by a cooling rate slower than air cooling, the coarse intergranular $\alpha$-phase causing a reduction in the fatigue characteristic ends up being produced. In the above process, it is possible to obtain a $\beta$-annealed structure. This structure is superior in fracture toughness, but is poor in ductility, so it is necessary to stabilize the structure and remove the residual strain by the next step of the heat treatment.

A The next step of the heat treatment, that is, the heating to 650° C. to 850° C., holding to at least 30 minutes, and cooling at a cooling rate of less than air cooling, stabilizes the unstable structure remaining during the cooling in the previous step and removes the majority of the residual strain during the cooling. The heating and holding temperature is 650 to 850° C. because with a temperature lower than that, the diffusion is slow and stabilization of the structure is not achieved. If the temperature is higher than this, the structure becomes coarse and the fatigue characteristic deteriorates. The holding time is over 30 minutes because if not held for a time of at least this, sufficient stabilization of the structure or removal of the residual strain is not achieved. The cooling has to be performed at a cooling rate of not more than air cooling. If cooling by a cooling rate faster than this, strain again accumulates during cooling.

When residual strain is still found in the above step or for applications for which there is a need to reduce the residual strain to an extreme degree, the pipe is heated to 450 to 650° C., held there for at least 2 hours, and cooled by a cooling rate of not more than air cooling. Due to this, the residual strain is substantially completely removed. The pipe is heated and held at 450 to 650° C. because if a temperature lower than this, removal of the strain is not achieved. Further, if heating to a temperature over 650° C., the pipe may deform, though slightly, due to the thermal strain. In this case, it is necessary to perform the steps of pipe configuration adjustment or removal of strain again. The holding time is at least 2 hours because if less than that sufficient removal of strain was not achieved. The cooling after the heat treatment had to be at a cooling rate of less than air cooling in order to avoid accumulation of excess strain.

Due to the above process, a desired $\beta$-annealed structure is obtained. Further, it is possible to remove even the strain accumulated at the steps of cooling after the heat treatment, forming by the U-O method or press bending method, welding, etc. Consequently, it is possible to obtain a pipe with a superior quality of material. Further, although the weld zone and heat-affected zone have $\beta$ grain sizes different from that of the parent metal, the structure becomes substantially the same as that of the parent metal and scattering of characteristics can be suppressed.

The process described in (13) is effective if combined with cold adjustment of pipe configuration. That is, by suitably performing cold adjustment of pipe configuration between up to three steps of heat treatment, it is possible to more effectively and efficiently adjust the pipe configuration and remove strain.

EXAMPLES

The present invention will be explained in further detail below by examples.

9

(Test 1)

First, comparative examples according to conventional methods will be explained.

Solid or hollow billets of various α+β titanium alloys shown in Table 1 were prepared and formed into seamless pipes of various diameters and wall thicknesses by a series of rolling processes of piercing, elongating, and sizing or hot extrusion. The length of each seamless pipe was about 10 m. Further, some of the seamless pipes were further cold drawn.

As shown in Table 1, Sample Nos. 1, 2, 3, 4, 5, 7, and 9 not cold drawn had extremely large unevenness of wall thickness. The ratios of the minimum wall thickness to the maximum wall thickness were all below 0.95. Sample Nos. 6, 8, and 10 are the seamless pipes of Sample Nos. 5, 7, and 9 which are further cold drawn. The cold drawing reduces the degree of unevenness of wall thickness, but Sample No. 6 having an outside diameter of the pipe of at least 150 mm and a wall thickness of at least 6 mm continued to have a large unevenness of wall thickness of a ratio of the minimum wall thickness to the maximum wall thickness of less than 0.95. Sample No. 8 having an outside diameter of the pipe of less than 150 mm and Sample No. 10 having a wall thickness of less than 6 mm had ratios of the minimum wall thickness to the maximum wall thickness of more than 0.95, showing a reduced unevenness of wall thickness. However, considerable machining was required for removing flaws occurring at the time of extrusion.

10

The high strength α+β titanium alloy plates used were in all cases plates worked at a reduction of at least 50% in the temperature region of not more than the β-transus temperature and then annealed in the temperature region not more than the β-transus temperature.

In Table 2, Sample No. 11 is an example of invention (2), Sample Nos. 12 and 13 are examples of the invention (3), Sample Nos. 14 to 15 are examples of the invention (4), Sample Nos. 16 to 19 are examples of the invention (5), and Sample Nos. 22 to 23 are examples of the invention (1).

All of these were produced by the methods described in (8), (9), and (12). The examples of the above inventions (1) to (5) are all pipes having an outside diameter of at least 150 mm and a wall thickness of at least 6 mm, comprised of high strength α+β titanium alloys, having a welded seam at one location in the longitudinal direction of the pipe, and having a ratio of the minimum wall thickness to the maximum wall thickness in the range of 0.95 to 0.99 for the portions other than the weld zone.

The pipes of the inventions (1) to (5) have a remarkably smaller unevenness of wall thickness compared with seamless pipes of the same degree of diameter and wall thickness explained in Test 1. That is, it is possible to provide a pipe comprised of a high strength α+β titanium alloy without a large amount of machining leading to a large increase in cost and free from wasted weight and to make sufficient use of the features of titanium alloy of light weight and high strength.

TABLE 1

| Sample No. | Alloy | Outside diameter of pipe (mm) | Wall thickness (mm) Min. | Wall thickness (mm) Max. | Min. wall thickness/ Max. wall thickness | Manufacturing method | Remarks |
| --- | --- | --- | --- | --- | --- | --- | --- |
| 1 | Ti—6Al—4V | 250 | 20.0 | 22.1 | 0.905 | Piercing-elongating-sizing | Comp. Ex., seamless pipe |
| 2 | Ti—6Al—4V ELI—0.05 Pd | 250 | 14.5 | 16.1 | 0.901 | Piercing-elongating-sizing | Comp. Ex., seamless pipe |
| 3 | Ti—6Al—4V ELI | 700 | 28.1 | 30.2 | 0.930 | Hot extrusion | Comp. Ex., seamless pipe |
| 4 | Ti—3Al—2.5V | 400 | 20.2 | 22.0 | 0.918 | Piercing-elongating-sizing | Comp. Ex., seamless pipe |
| 5 | Ti—3Al—2.5V | 170 | 8.0 | 8.8 | 0.909 | Hot extrusion | Comp. Ex., seamless pipe |
| 6 | Ti—3Al—2.5V | 160 | 7.0 | 7.5 | 0.933 | Hot extrusion-cold drawing | Comp. Ex., seamless pipe |
| 7 | Ti—3Al—2.5V—0.05Pd | 140 | 8.0 | 8.9 | 0.899 | Hot extrusion | Comp. Ex., seamless pipe |
| 8 | Ti—3Al—2.5V—0.05Pd | 130 | 7.0 | 7.3 | 0.959 | Hot extrusion-cold drawing | Comp. Ex., seamless pipe |
| 9 | Ti—3Al—2.5V—0.1Ru | 170 | 5.5 | 5.9 | 0.932 | Hot extrusion | Comp. Ex., seamless pipe |
| 10 | Ti—3Al—2.5V—0.1Ru | 160 | 5.0 | 5.2 | 0.961 | Hot extrusion-cold drawing | Comp. Ex., seamless pipe |

(Test 2)

Plates of various high strength α+β titanium alloys shown in Table 2 (thickness of 5.5 to 29 mm, length about 10 m) were cold formed into tubular shapes by the U-O method or press bending method, the abutted plate edges were welded by keyhole plasma welding, and overlaying was performed by one to six passes of TIG welding using a welding filler having the same composition as the base metal to produce high strength α+β titanium alloy pipes of the present invention of a length of approximately 10 m. The welding was performed in all cases by using argon gas, arranging the tubular shaped members so that the abutted plate edges came to the top, and making all welds from the top of the outside of the tubular shaped member.

Here, Sample Nos. 20 and 21 are pipes with small unevennesses of wall thickness: the ratio of the minimum wall thickness to the maximum wall thickness was at least 0.95. But even the cold drawn seamless pipes of Sample NOS. 8 and 10 of the same dimensions gave pipes with less unevenness of wall thickness: the ratio of the minimum wall thickness to the maximum wall thickness was at least 0.95. Of course, there is the advantage of the lack of need for machining for removing flaws such as in seamless pipes, but this is not more advantageous than in seamless pipe from the viewpoint of unevenness of wall thickness. Sample No. 20 is a pipe of a diameter smaller than the outside diameter of 150 mm defined in inventions (1) to (5), while Sample No.

21 is one with a wall thickness of less than the 6 mm defined in inventions (1) to (5), so the effect of the present invention cannot be sufficiently exhibited.

Note that Sample Nos. 11 to 19, 20, 23, and 23 are all made using α+β titanium alloy plates of a thickness of at least 6 mm. In all cases, pipes of a wall thickness of at least 6 mm are produced. However, Sample No. 21 used a medium thick plate of a thickness of 5.5 mm, that is, a thickness of less than 6 mm, so the wall thickness after making the pipe also becomes less than 6 mm.

when the value of the critical outside diameter/wall thickness was over 24, but large wrinkles occurred, the state of abutting of the plate edges was poor, the welding of the next step could not be performed stably, and sufficient circularity could not be secured.

Sample No. 36 using the conventional roll forming method had a further poorer formability, suffered from cracks and could not be formed sufficiently even in the case of a pipe of an outside diameter of 700 mm (outside diameter/wall thickness=28).

TABLE 2

| Sample No. | Alloy | Cold forming method | Outside diameter of pipe (mm) | Wall thickness (mm)* Min. | Wall thickness (mm)* Max. | Min. wall thickness*/ Max. wall thickness | Remarks |
|---|---|---|---|---|---|---|---|
| 11 | Ti—3Al—2.5V | U-O | 170 | 8.0 | 8.3 | 0.964 | Invention 2, 8, 9, 12 |
| 12 | Ti—3Al—2.5V—0.05Pd | U-O | 170 | 8.0 | 8.3 | 0.964 | Invention 3, 8, 9, 12 |
| 13 | Ti—3Al—2.V—0.1Ru | Press bending | 400 | 20.1 | 20.5 | 0.980 | Invention 3, 8, 9, 12 |
| 14 | Ti—6Al—4V | Press bending | 700 | 28.0 | 28.5 | 0.982 | Invention 4, 8, 9, 12 |
| 15 | Ti—6Al—4V ELI | U-O | 700 | 28.0 | 28.4 | 0.986 | Invention 4, 8, 9, 12 |
| 16 | Ti—6Al—4V—0.05Pd | U-O | 700 | 27.9 | 28.3 | 0.986 | Invention 5, 8, 9, 12 |
| 17 | Ti—6Al—4V—0.2Ru | U-O | 250 | 14.4 | 14.6 | 0.986 | Invention 5, 8, 9, 12 |
| 18 | Ti—6Al—4V—ELI—0.1Pd | U-O | 250 | 14.5 | 14.8 | 0.980 | Invention 5, 8, 9, 12 |
| 19 | Ti—6Al—4V—ELI—0.1Ru | U-O | 250 | 14.5 | 14.9 | 0.973 | Comp. Ex. |
| 20 | Ti—3Al—2.5V—0.05Pd | U-O | 130 | 7.0 | 7.3 | 0.959 | Comp. Ex. |
| 21 | Ti—3Al—2.5V—0.1Ru | U-O | 160 | 4.9 | 5.1 | 0.961 | Invention 1, 8, 9, 12 |
| 22 | Ti—1.5Fe—0.4% O—0.04% N | U-O | 170 | 7.9 | 8.3 | 0.952 | Invention 1, 8, 9, 12 |
| 23 | Ti—1Fe—0.3% O | U-O | 170 | 7.9 | 8.2 | 0.963 | |

*Except weld zone.

(Test 3)

Next, Ti-6Al-4V ELI (β-transus temperature: 965° C.) plates of a thickness of 25 mm, produced under the various plate manufacturing conditions shown in Table 3, were used to form pipes of various outside diameters by the various forming methods shown in the same Table 3. The formabilities were evaluated by the values of the minimum outside diameter/wall thickness enabling formation of a pipe without causing cracks. Here, Sample Nos. 24 to 34 and 36 used plates of a length of 8 m, while Sample No. 35 used a plate of a length of 2 m. These tubular shaped members were then welded by the same method as in Test 2 to form them into α+β titanium alloy pipes. Note that in each of these tests, when rolling plates in a temperature region of not more than the β-transus temperature, cross rolling was performed by rotating the rolling direction by 90 degrees on the way.

In Table 3, Sample Nos. 24 to 34 of the present invention, formed by the press bending method or U-O method, had ratios between the minimum outside diameter enabling the formation into a tubular shape without causing cracks, that is, the critical outside diameter, and wall thickness in the range of 10 to 24, though with differences due to differences in the manufacturing conditions of the thick plates used, and enabled cold forming into tubular shapes. Further, the state of abutting of the plate ends was good.

On the other hand, Sample No. 35 using the conventional roll bending method could be formed into a tubular shape As explained above, cold forming was only possible in the case of forming by the press bending method or U-O method according to the present invention.

On the other hand, among Sample Nos. 24 to 33 formed by the press bending method, Sample Nos. 25 to 31 had values of the critical outside diameter/wall thickness of not more than 16 and therefore pipes with smaller outside diameters could be formed. This is due to the effects of the invention (12). That is, these plates were worked at a reduction of at least 50% in a temperature region of not higher than the β-transus temperature and were annealed in a temperature region of not higher than the β-transus temperature, were comprised of an equiaxed structure or an elongated structure called a mill annealed structure with a good ductility, and could be formed under more stringent conditions. As opposed to this, Sample Nos. 24, 32, and 33 could only form pipes of a relatively large diameter of values of the critical outside diameter/wall thickness of 20 to 24. This was because in Sample No. 24, the reduction of the rolling of the plate below the β-transus temperature defined in invention (12) was less than 50%, while in Sample Nos. 32 and 33, the annealing temperature was at least the β-transus temperature, so acicular structures poor in ductility developed, cracks easily occurred during the forming, and only large diameter pipes with relatively easy working conditions could be formed.

TABLE 3

| Sample No. | Plate manufacturing conditions | | | Limit outside diameter/ wall thickness** | Remarks |
|---|---|---|---|---|---|
| | Reduction at or below β-transus temperature | Annealing conditions | Forming method | | |
| 24 | 40 | 750° C.-4 hours-furnace cooling | Press bending method | 20 | Invention 4, 8, 9 |
| 25 | 60 | 750° C.-4 hours-furnace cooling | Press bending method | 14 | Invention 4, 8, 9, 12 |
| 26 | 80 | 750° C.-4 hours-furnace cooling | Press bending method | 12 | Invention 4, 8, 9, 12 |
| 27 | 90 | 750° C.-4 hours-furnace cooling | Press bending method | 12 | Invention 4, 8, 9, 12 |
| 28 | 90 | 750° C.-4 hours-furnace cooling | Press bending method | 10 | Invention 4, 8, 9, 12 |
| 29 | 90 | 850° C.-2 hours-furnace cooling | Press bending method | 12 | Invention 4, 8, 9, 12 |
| 30 | 90 | 930° C.-1 hour-furnace cooling | Press bending method | 12 | Invention 4, 8, 9, 12 |
| 31 | 90 | 930° C.-1 hour-furnace cooling | Press bending method | 16 | Invention 4, 8, 9, 12 |
| 32 | 90 | 990° C.-10 min-air cooling | Press bending method | 22 | Invention 4, 8, 9 |
| 33 | 90 | 990° C.-30 min-air cooling | Press bending method | 24 | Invention 4, 8, 9 |
| 34 | 90 | 750° C.-4 hours-furnace cooling | U-O method | 14 | Invention 4, 8, 9, 12 |
| 35 | 90 | 750° C.-4 hours-furnace cooling | Roll bending method | 24 | Comp. Ex., wrinkling, poor circularity |
| 36 | 90 | 750° C.-4 hours-furnace cooling | Roll forming method | — | Comp. Ex., small cracks even with outside diameter/wall thickness = 28 |

*Reduction of thickness
**Minimum outside diameter/wall thickness (25 mm) enabling forming to tubular shape without causing cracks (Test 4)

Next, Ti-3Al-2.5V plates of a thickness of 28 mm and a length of 12 m were cold formed into tubular shapes of an outside diameter of 700 mm by the press bending method and the abutted plate edges were welded together under the various conditions shown in Table 4 to produce Ti-3Al-2.5V pipes according to the present invention. Here, the titanium alloy plates used were worked at a rolling reduction of 90% in a temperature region of not more than the β-transus temperature, then annealed at 700° C., which was below the β-transus temperature. Each of the welded pipes was then heat treated under conditions of 720° C.-2 hours-air-cooling, adjusted in pipe configuration, then heat treated under conditions of 540° C.-4 hours-air-cooling. A rod-shaped test piece having a parallel portion, 30 mm long and 8 mm in diameter, was taken from the welded metal near the outside surface of each pipe in a direction parallel to the longitudinal direction of the pipe and subjected to an axial force fatigue test under a stress ratio of minus 1 (tension-compression). The strength at which there was no failure even with $10^{-7}$ cycles was defined as the fatigue strength. The fatigue characteristics were evaluated based on this.

A fatigue test was also conducted on the base metal, and the fatigue strength of the base metal was 330 MPa. Note that the grooves were prepared before the pipe forming and, when keyhole plasma welding was used, a Y-groove was used with a root face of 18 mm and an upper part opened 45 degrees (90 degrees in abutted state). When performing electron beam welding, an I-groove was used. When welding by only TIG welding or MIG welding, a V-groove was used and the angle was made 60 degrees in the abutted state. Note that in all of these welding processes, tack welding was performed by TIG welding before the main welding.

Further, a filler having the same composition as the base metal was used for welding other than electron beam welding and keyhole plasma welding.

In Table 4, Sample Nos. 37 to 47 are examples of the invention (9), in which the tubular shaped member is arranged so that the abutted plate edges come to the top and is welded from the top of the outside of the tubular shaped member. Among these, Sample No. 37 is an example of full welding by TIG welding using argon as the shield gas. While a large 30 passes were required, it was possible to produce a titanium alloy pipe of the invention (2).

The fatigue strength was also somewhat lower than that of the parent metal and was sufficient as a weld zone.

Sample Nos. 38 and 39 could be welded by a single pass by electron beam welding and low voltage electron beam welding and were therefore remarkably effective, but these welding methods were high in cost due to the enormous capital costs.

Sample No. 40 showed that welding could be completed in five passes with MIG welding and was effective compared with TIG welding of the entirety (Sample No. 37), but had the defect of having a fatigue strength of the welding metal lower than with other welding methods.

As opposed to this, Sample Nos. 41 and 42, which are examples of the invention (8), are combinations with keyhole plasma welding. The total welding was completed by a total of seven passes or eight passes of welding. These were remarkably more effective than the case of only TIG welding. Further, the fatigue strength was not different from that of other methods and was considerably higher than with MIG welding.

Sample Nos. 37, 41, and 42 are examples where all welding is performed in an argon gas atmosphere, but part or all of the pilot gas and shield gas was made helium gas. Sample Nos. 43 and 44 to 47 were further improved in welding efficiency and enabled a reduction in the total number of welding passes compared with when welding with only argon gas under similar conditions. Further, the fatigue strength became higher than even when welding by only argon gas under similar conditions. These are the effects of the invention (11).

Next, in Table 4, Sample Nos. 48 to 50 are examples of the invention (10), in which the tubular shaped member is arranged so that the abutted plate edges come to the bottom and is welded from the top of the inside of the tubular shaped member. Since the initial welding portion where welding defects are difficult to occur becomes at the outside of the pipes, it is possible to reduce the defects at the outside of the pipes which often become causes of occurrence of fatigue cracks. The fatigue strength becomes further higher or over 350 MPa. In particular, this effect is remarkable when using helium gas as the pilot gas.

On the other hand, in Table 4, Sample No. 51 is an example in which the tubular shaped member is arranged so that the abutted plate edges come to the true horizontal and is welded from the outside of the true horizontal of the tubular shaped member. With this arrangement, since the force of gravity acting on the melted portion and the direction of solidification become perpendicular, porosity and other welding defects easily form at the weld zone. Therefore, comparing with the case where the force of gravity acting on the melted portion and the direction of solidification are parallel, the fatigue strength falls. While it is somewhat lower than the parent metal (330 MPa), it is still a high value of at least 300 MPa.

A Ti-6Al-4V ELI-0.1RU plate having a thickness of 28 mm and a length of 10 m, worked at a reduction of 90% in a temperature region of not more than the β-transus temperature (965° C.) and then annealed at 750° C., which is below the β-transus temperature, was cold formed by the press bending method to a tubular shape of an outside diameter of 700 mm. The abutted plate edges were welded by the keyhole plasma welding method and overlaid by six passes of TIG welding using a welding filler (the same composition as the base metal) to produce a Ti-6Al-4V ELI-0.1RU pipe. Here, the welding was performed using all argon gas, the tubular shaped member was arranged so that the abutted plate edges came to the top, and all of the welding was performed from the top of the outside of the tubular shaped member.

The grooves were prepared before the forming. A Y-groove was made with a root face of 18 mm and a top part opened to 45 degrees (90 degrees in abutted state). Next, the pipe was heat treated under the conditions shown in Table 5. Rod-shaped tensile test pieces of a gauge length of 25 mm and a diameter of the gauge portion of 6.25 mm were taken from both the base metal and the weld metal parallel to the longitudinal direction of the pipe and subjected to tensile tests to measure the elongation. Further, a rod-shaped test piece of a length of the parallel portion of 30 mm and a diameter of 8 mm was cut out from the weld metal near the outside surface of the pipe in a direction parallel to the longitudinal direction of the pipe, and subjected to an axial force fatigue test under a stress ratio of minus 1 (tension-compression). The strength at which there was no failure even with $10^{-7}$ cycles was defined as the fatigue strength. The fatigue characteristics were evaluated based on this.

Further, a one-inch CT test piece was taken so that the direction of crack propagation became parallel to the lon-

TABLE 4

| Sample No. | Welding conditions | Position* | Wall thickness (mm)* Min. | Wall thickness (mm)* Max. | Min. wall thickness/ max. wall thickness* | Fatigue strength | Remarks |
|---|---|---|---|---|---|---|---|
| 37 | TIG welding (Ar), 30 passes | A | 28.0 | 28.4 | 0.986 | 320 | Invention 2, 7, 9, 12 |
| 38 | Electron beam welding, 1 pass | A | 28.2 | 28.6 | 0.986 | 340 | Invention 2, 7, 9, 12 |
| 39 | Low voltage electron beam welding, 1 pass | A | 28.1 | 28.6 | 0.983 | 340 | Invention 2, 7, 9, 12 |
| 40 | MIG welding (Ar), 5 passes | A | 27.9 | 28.6 | 0.976 | 290 | Invention 2, 7, 9, 12 |
| 41 | Keyhole plasma welding (Ar), 1 pass + TIG welding (Ar), 6 passes | A | 27.8 | 28.2 | 0.986 | 320 | Invention 2, 8, 9, 12 |
| 42 | Keyhole plasma welding (Ar), 1 pass + plasma welding (Ar), 3 passes | A | 28.0 | 28.4 | 0.986 | 320 | Invention 2, 8, 9, 12 |
| 43 | TIG welding (He), 25 passes | A | 27.8 | 28.4 | 0.979 | 340 | Invention 2, 7, 9, 11, 12 |
| 44 | Keyhole plasma welding (Ar), 1 pass + TIG welding (overall He), 4 passes | A | 27.8 | 28.2 | 0.986 | 340 | Invention 2, 7, 9, 11, 12 |
| 45 | Keyhole plasma welding (Ar), 1 pass + TIG welding (torch gas He), 4 passes | A | 28.0 | 28.5 | 0.982 | 340 | Invention 2, 7, 9, 11, 12 |
| 46 | Keyhole plasma welding (Ar), 1 pass + plasma welding (overall He), 2 passes | A | 27.9 | 28.4 | 0.982 | 340 | Invention 2, 7, 9, 11, 12 |
| 47 | Keyhole plasma welding (Ar), 1 pass + plasma welding (pilot gas He), 2 passes | A | 28.2 | 28.6 | 0.986 | 340 | Invention 2, 7, 9, 11, 12 |
| 48 | Keyhole plasma welding (Ar), 1 pass + plasma welding (Ar), 3 passes | B | 27.9 | 28.5 | 0.987 | 350 | Invention 2, 8, 10, 12 |
| 49 | Keyhole plasma welding (pilot gas He), 1 pass + plasma welding (Ar), 3 passes | B | 28.1 | 28.5 | 0.986 | 360 | Invention 2, 8, 10, 11, 12 |
| 50 | Keyhole plasma welding (pilot gas He), 1 pass + plasma welding (overall He), 2 passes | B | 28.0 | 28.5 | 0.982 | 360 | Invention 2, 8, 10, 11, 12 |
| 51 | Keyhole plasma welding (pilot gas He), 1 pass + plasma welding (overall He), 2 passes | C | 28.0 | 28.5 | 0.982 | 310 | Invention 2, 8, 11, 12 |

*Welding position: A: arrange tubular shaped member so that abutted plate edges come at top and weld from top of outside; B: arrange tubular shaped member so that abutted plate edges come at bottom and weld from top of inside; and C: Arrange tubular shaped member so that abutted plate edges come at true horizontal and weld from outside of true horizontal.
**Except weld zone.

gitudinal direction, subjected to a KIC test, and measured for the KQ value as the fracture toughness value. Note that pipe configuration adjustment is performed between the heat treatments and after the final heat treatment when heat treatment is comprised of a plurality of steps and is performed after the heat treatment when the heat treatment is comprised of a single step.

In Table 5, among the examples of the invention (6), Sample Nos. 55 to 56 and 58 to 73 where both the base metals and the weld metals had β-annealed structures, had high fracture toughnesses of at least 80 MPa·√m at both the base metals and the weld metals, and were titanium alloy pipes particularly effective for applications for which high fracture toughnesses are required. On the other hand, Sample Nos. 52, 53, 54, and 57 had high fracture toughnesses of the welding metals, but the base metals were mill annealed structures or equiaxed structures, so the fracture toughness became low and the samples were unsuited for applications for which high fracture toughnesses are desired.

Among the examples of the invention (6), Sample Nos. 56, 58, 60, 64, 66, 67, 69, 70, and 73 are examples of production by the method of (13). These all had relatively high elongations of at least 8%, high fracture toughness values of at least 80 MPa·√m, and high fatigue strengths of at least 480 MPa. This is because the effects of the invention (13) were sufficiently achieved. In particular, in Sample Nos. 69, 70, and 73, high ductilities (elongations) were obtained, but these were achieved by the sufficient removal of the strain accumulated in the manufacturing process.

On the other hand, Sample No. 55 had a low value of elongation of 5% in both the base metal and the weld metal. This is because since it was heated to at least the β-transus temperature, then not subjected to any heat treatment, it was not possible to stabilize the unstable structure retained after the cooling and it was not possible to remove the residual strain during the cooling.

Sample No. 59 gave a relatively high elongation and high fracture toughness in both the base metal and weld metal, but had an extremely low fatigue strength. This is because it was heated to a temperature of at least the β-transus temperature, then not cooled at a cooling rate of at least the air-cooling rate defined in the present invention, therefore the coarse intergranular α-phase worsening the fatigue characteristics was produced and the fatigue characteristics ended up falling.

Sample Nos. 61, 62 and 65 only gave low elongations in both of the base metals and weld metals. In sample No. 61, the holding time of the heat treatment performed following the heating and cooling to above the β-transus temperature was less than the 30 minutes defined in the invention (13), so stabilization of the structures and removal of the residual strain were not sufficiently achieved. Sample No. 62 had a temperature of the same heat treatment lower than the 650° C. defined in the invention (13), so diffusion was insufficient and stabilization of the structure could not be achieved. Sample No. 65 had a cooling rate after the heat treatment faster than the cooling rate under the air cooling defined in (13), so strain again accumulated during cooling. Further, Sample No. 63 had a temperature of heat treatment after heating and cooling to a temperature of at least the β-transus temperature higher than the 850° C. defined in (13), so the structure became coarse and the fatigue strength became lower.

Now, Sample Nos. 68, 71, 72, and 73 achieved relatively high elongations, high fracture toughnesses, and high fatigue strengths in both of the parent metals and weld metals, but despite the three-step heat treatment, only characteristics substantially the same or somewhat lower than those of Sample No. 56 which was only subjected to two-step heat treatment could be obtained. The reason is that Sample No. 68 had a temperature of heat treatment of the third step lower than the 450° C. defined in (13), so further removal of strain was not achieved; Sample No. 71 had a temperature of heat treatment of the same third step higher than the 650° C. defined in (13), so thermal strain resulted in deformation of the pipe and reaccumulation of strain during the subsequent pipe configuration adjustment; Sample No. 72 had a time of heat treatment of the same third step shorter than the 2 hours defined in (13), so further removal of strain was not sufficiently achieved; while Sample No. 73 had a cooling rate after the heat treatment of the same third step faster than the cooling rate by air cooling or less defined in (13), so strain accumulated again during the cooling.

TABLE 5

| Sample No. | Heat treatment of pipe | Parent metal | | | | Welding metal | | | | Remarks |
| --- | --- | --- | --- | --- | --- | --- | --- | --- | --- | --- |
| | | Structure | Elongation (%) | fracture toughness (MPa·√m) | Fatigue strength (MPa) | Structure | Elongation (%) | fracture toughness (MPa·√m) | Fatigue strength (MPa) | |
| 52 | None | Mill annealed | 18.0 | 51.1 | 480 | β-annealed (fine) | 5.0 | 81.3 | 470 | Invention 5, 8, 9, 12 |
| 53 | 750° C.-1 h/AC | Mill annealed | 18.1 | 50.5 | 480 | β-annealed (fine) | 9.2 | 88.9 | 480 | Invention 5, 8, 9, 12 |
| 54 | 920° C.-1 h/AC | Equiaxed | 17.5 | 52.0 | 480 | β-annealed (fine) | 9.5 | 90.2 | 480 | Invention 5, 8, 9, 12 |
| 55 | 990° C.-15 min/AC | β-annealed (fine) | 5.4 | 80.3 | 500 | β-annealed (fine) | 5.2 | 80.0 | 500 | Invention 5, 8, 9, 12, 6 |
| 56 | 990° C.-15 min/AC + 720° C.-2 h/AC | β-annealed (fine) | 10.3 | 92.2 | 500 | β-annealed (fine) | 9.0 | 90.2 | 500 | Invention 5, 8, 9, 12, 6, 13 |
| 57 | 930° C.-15 min/AC + 720° C.-2 h/AC | Equiaxed | 16.8 | 49.9 | 480 | β-annealed (fine) | 8.8 | 83.0 | 480 | Invention 5, 8, 9, 12 |
| 58 | 990° C.-15 min/WQ + 720° C.-2 h/AC | β-annealed (fine) | 10.6 | 82.0 | 500 | β-annealed (fine) | 9.1 | 82.2 | 500 | Invention 5, 8, 9, 12, 6, 13 |
| 59 | 990° C.-15 min/FC + 720° C.-2 h/AC | β-annealed (coarse) | 8.3 | 105.2 | 420 | β-annealed (coarse) | 8.1 | 104.6 | 430 | Invention 5, 8, 9, 12, 6 |

TABLE 5-continued

| | | Parent metal | | | | Welding metal | | | | |
|---|---|---|---|---|---|---|---|---|---|---|
| Sample No. | Heat treatment of pipe | Structure | Elongation (%) | fracture toughness (MPa · √m) | Fatigue strength (MPa) | Structure | Elongation (%) | fracture toughness (MPa · √m) | Fatigue strength (MPa) | Remarks |
| 60 | 990° C.-15 min/AC + 680° C.-40 min/AC | β-annealed (fine) | 10.5 | 93.0 | 500 | β-annealed (fine) | 9.5 | 92.5 | 500 | Invention 5, 8, 9, 12, 6, 13 |
| 61 | 990° C.-15 min/AC + 680° C.-40 min/AC | β-annealed (fine) | 5.8 | 81.3 | 490 | β-annealed (fine) | 5.3 | 82.7 | 490 | Invention 5, 8, 9, 12, 6 |
| 62 | 990° C.-15 min/AC + 630° C.-2 h/AC | β-annealed (fine) | 6.2 | 82.2 | 490 | β-annealed (fine) | 5.6 | 81.2 | 490 | Invention 5, 8, 9, 12, 6 |
| 63 | 990° C.-15 min/AC + 880° C.-1 h/AC | β-annealed (coarse) | 6.3 | 83.3 | 430 | β-annealed (coarse) | 6.3 | 82.4 | 430 | Invention 5, 8, 9, 12, 6 |
| 64 | 990° C.-15 min/AC + 820° C.-1 h/AC | β-annealed (fine) | 10.7 | 83.5 | 490 | β-annealed (fine) | 9.6 | 82.5 | 490 | Invention 5, 8, 9, 12, 6, 13 |
| 65 | 990° C.-15 min/AC + 720° C.-2 h/WQ | β-annealed (fine) | 5.9 | 90.0 | 490 | β-annealed (fine) | 5.0 | 90.1 | 490 | Invention 5, 8, 9, 12, 6 |
| 66 | 990° C.-15 min/AC + 720° C.-2 h/FC | β-annealed (fine) | 10.7 | 90.3 | 490 | β-annealed (fine) | 10.5 | 92.5 | 490 | Invention 5, 8, 9, 12, 6, 13 |
| 67 | 990° C.-15 min/AC − 720° C.-2 h/AC + 540° C.-4 h/AC | β-annealed (fine) | 12.2 | 93.4 | 500 | β-annealed (fine) | 11.0 | 92.6 | 500 | Invention 5, 8, 9, 12, 6, 13 |
| 68 | 990° C.-15 min/AC − 720° C.-2 h/AC + 420° C.-4 h/AC | β-annealed (fine) | 10.5 | 89.3 | 500 | β-annealed (fine) | 9.5 | 89.9 | 500 | Invention 5, 8, 9, 12, 6 |
| 69 | 990° C.-15 min/AC − 720° C.-2 h/AC + 480° C.-4 h/AC | β-annealed (fine) | 12.0 | 88.9 | 500 | β-annealed (fine) | 10.8 | 90.3 | 500 | Invention 5, 8, 9, 12, 6, 13 |
| 70 | 990° C.-15 min/AC − 720° C.-2 h/AC + 620° C.-2 h 20 min/AC | β-annealed (fine) | 12.3 | 92.5 | 490 | β-annealed (fine) | 11.3 | 91.6 | 490 | Invention 5, 8, 9, 12, 6, 13 |
| 71 | 990° C.-15 min/AC − 720° C.-2 h/AC + 680° C.-2 h 20 min/AC | β-annealed (fine) | 12.2 | 91.8 | 490 | β-annealed (fine) | 11.2 | 91.8 | 490 | Invention 5, 8, 9, 12, 6 |
| 72 | 990° C.-15 min/AC − 720° C.-2 h/AC + 620° C.-1 h 30 min/AC | β-annealed (fine) | 10.0 | 90.8 | 500 | β-annealed (fine) | 9.1 | 91.5 | 500 | Invention 5, 8, 9, 12, 6 |
| 73 | 990° C.-15 min/AC − 720° C.-2 h/AC + 540° C.-4 h/WQ | β-annealed (fine) | 9.2 | 82.4 | 490 | β-annealed (fine) | 9.3 | 83.3 | 490 | Invention 8, 9, 12, 6 |
| 74 | 990° C.-15 min/AC − 720° C.-2 h/AC + 540° C.-4 h/FC | β-annealed (fine) | 12.6 | 90.3 | 500 | β-annealed (fine) | 12.7 | 91.0 | 500 | Invention 5, 8, 9, 12, 6, 13 |

In this way, by applying the present invention (13), it is possible to produce an α+β titanium alloy pipe having a β-annealing structure superior in fracture toughness and having a high fatigue strength and high ductility, by removing the strain accumulated in the processes of cold forming, welding, etc., and suppressing the coarse α-phase. The weld zone of the titanium alloy pipe has substantially the same structure as the base metal and is suppressed in scattering of the characteristics of the material.

CAPABILITY OF UTILIZATION IN INDUSTRY

As explained above, by applying the present invention, it is possible to provide a high strength α+β titanium alloy pipe not requiring a large amount of cutting which would significantly increase the cost and enabling full use to be made of the features of titanium alloy of light weight and high strength. Further, it is possible to produce such a titanium alloy pipe at a low cost.

What is claimed is:

1. A high strength α+β titanium alloy pipe having an outside diameter of at least 150 mm and a wall thickness of at least 6 mm, said α+β titanium alloy pipe characterized by having a welded seam running in the longitudinal direction of pipe at one location and by having a ratio of a minimum wall thickness to a maximum wall thickness of the portions excluding the weld zone of 0.95 to 0.99;
   wherein the high strength α+β titanium alloy contains by wt %,
   Al: 2.5 to 3.5% and V: 2.0 to 3.0% and
   the balance of Ti and unavoidable impurities.

2. A high strength α+β titanium alloy pipe as set forth in claim 1, wherein the high strength α+β titanium alloy further contains by wt %,
   at least one of Pd and Ru: 0.01 to 0.5% in total.

3. A high strength α+β titanium alloy pipe having an outside diameter of at least 150 mm and a wall thickness of at least 6 mm, said α+β titanium alloy pipe characterized by having a welded seam running in the longitudinal direction of pipe at one location and by having a ratio of a minimum wall thickness to a maximum wall thickness of the portions excluding the weld zone of 0.95 to 0.99;

wherein the high strength α+β titanium alloy contains by wt %,

Al: 5.5 to 6.75% and V: 3.5 to 4.5%, and the balance of Ti and unavoidable impurities.

4. A high strength α+β titanium alloy pipe as set forth in claim 3, wherein the high strength α+β titanium alloy further contains by wt %, at least one of Pd and Ru: 0.01 to 0.5% in total.

5. A high strength α+β titanium alloy pipe as set forth in claim 1 or 3, wherein the pipe as a whole is comprised of a β-annealed structure.

6. A method of production of a pipe having an outside diameter of at least 150 mm and a wall thickness of at least 6 mm, comprised of a high strength α+β titanium alloy, having a welded seam running in the longitudinal direction of pipe at one location, and having a ratio of a minimum wall thickness to a maximum wall thickness of the portions excluding the weld zone of 0.95 to 0.99, said method of production of a high strength α+β titanium alloy pipe characterized by cold forming a high strength α+β titanium alloy plate of a thickness of at least 6 mm into a tubular shape by a method comprising U-shape press bending into a U-shape and further O-shape pressing into an O-shape or a method comprising a press-bending method and welding together the abutted plate edges;

wherein the high strength α+β titanium alloy contains by wt %,

Al: 2.5 to 3.5% and V: 2.0 to 3.0% and the balance of Ti and unavoidable impurities;

performing heat treatment comprising heating the welded pipe to at least the β-transus temperature and cooling at a cooling rate of at least air cooling, and further heating to 650° C. to 850° C., holding it there for at least 30 minutes, and cooling at a cooling rate of not more than air cooling.

7. A method of production of a pipe having an outside diameter of at least 150 mm and a wall thickness of at least 6 mm, comprised of a high strength α+β titanium alloy, having a welded seam running in the longitudinal direction of pipe at one location, and having a ratio of a minimum wall thickness to a maximum wall thickness of the portions excluding the weld zone of 0.95 to 0.99, said method of production of a high strength α+β titanium alloy pipe characterized by cold forming a high strength α+β titanium alloy plate of a thickness of at least 6 mm into a tubular shape by a method comprising U-shape press bending into a U-shape and further O-shape pressing into an O-shape or a method comprising a press-bending method and welding together the abutted plate edges;

wherein the high strength α+β titanium alloy contains by wt %,

Al: 2.5 to 3.5% and V: 2.0 to 3.0% and the balance of Ti and unavoidable impurities;

performing a series of heat treatments comprising heating the welded pipe to at least the β-transus temperature and cooling at a cooling rate of at least air cooling, further heating to 650° C. to 850° C., holding it there for at least 30 minutes, and cooling at a cooling rate of not more than air cooling, and heating to 450 to 650° C., holding it there for at least 2 hours, and cooling at a cooling rate of not more than air cooling.

8. A method of production of a high strength α+β titanium alloy pipe as set forth in claim 6 or 7 characterized in that the high strength α+β titanium alloy further contains by wt %, at least one of Pd and Ru: 0.01 to 0.5% in total.

9. A method of production of a pipe having an outside diameter of at least 150 mm and a wall thickness of at least 6 mm, comprised of a high strength α+β titanium alloy, having a welded seam running in the longitudinal direction of pipe at one location, and having a ratio of a minimum wall thickness to a maximum wall thickness of the portions excluding the weld zone of 0.95 to 0.99, said method of production of a high strength α+β titanium alloy pipe characterized by cold forming a high strength α+β titanium alloy plate of a thickness of at least 6 mm into a tubular shape by a method comprising U-shape press bending into a U-shape and further O-shape pressing into an O-shape or a method comprising a press-bending method and welding together the abutted plate edges;

wherein the high strength α+β titanium alloy contains by wt %,

Al: 5.5 to 6.75% and V: 3.5 to 4.5% and the balance of Ti and unavoidable impurities;

performing heat treatment comprising heating the welded pipe to at least the β-transus temperature and cooling at a cooling rate of at least air cooling, and further heating to 650° C. to 850° C., holding it there for at least 30 minutes, and cooling at a cooling rate of not more than air cooling.

10. A method of production of a pipe having an outside diameter of at least 150 mm and a wall thickness of at least 6 mm, comprised of a high strength α+β titanium alloy, having a welded seam running in the longitudinal direction of pipe at one location, and having a ratio of a minimum wall thickness to a maximum wall thickness of the portions excluding the weld zone of 0.95 to 0.99, said method of production of a high strength α+β titanium alloy pipe characterized by cold forming a high strength α+β titanium alloy plate of a thickness of at least 6 mm into a tubular shape by a method comprising U-shape press bending into a U-shape and further O-shape pressing into an O-shape or a method comprising a press-bending method and welding together the abutted plate edges;

wherein the high strength α+β titanium alloy contains by wt %,

Al: 5.5 to 6.75% and V: 3.5 to 4.5% and the balance of Ti and unavoidable impurities;

performing a series of heat treatments comprising heating the welded pipe to at least the β-transus temperature and cooling at a cooling rate of at least air cooling, further heating to 650° C. to 850° C., holding it there for at least 30 minutes, and cooling at a cooling rate of not more than air cooling, and heating to 450 to 650° C., holding it there for at least 2 hours, and cooling at a cooling rate of not more than air cooling.

11. A method of production of a high strength α+β titanium alloy pipe as set forth in claim 9 or 10, characterized in that the high strength α+β titanium alloy further contains by wt %, at least one of Pd and Ru: 0.01 to 0.5% in total.

12. A method of production of a high strength α+β titanium alloy pipe as set forth in claim 6, 7, 9 or 10, characterized by welding together the abutted plate edges by key hole plasma welding.

13. A method of production of a high strength α+β titanium alloy pipe as set forth in claim 6, 7, 9 or 10, characterized by welding together the abutted plate edges by key hole plasma welding and overlaying by plasma welding or TIG welding using a welding filler.

14. A method of production of a high strength α+β titanium alloy pipe as set forth in claim 6, 7, 9 or 10, characterized in that the pipe as a whole is comprised of a β-annealed structure.

15. A method of production of a high strength α+β titanium alloy pipe as set forth in claim 6, 7, 9 or 10, characterized by arranging the tubular shaped member so that the abutted plate edges come to the top and welding from the top of the outside of the tubular shaped member.

16. A method of production of a high strength α+β titanium alloy pipe as set forth in claim 6, 7, 9 or 10, characterized by arranging the tubular shaped member so that the abutted plate edges come to the bottom and welding from the top of the inside of the tubular shaped member.

17. A method of production of a high strength α+β titanium alloy pipe as set forth in claim 6, 7, 9 or 10, characterized in that part or all of a pilot gas and shield gas-used for the welding is helium gas.

18. A method of production of a high strength α+β titanium alloy pipe as set forth in claim, 6, 7, 9 or 10, wherein the high strength α+β titanium alloy plate of a thickness of at least 6 mm is a high strength α+β titanium alloy plate which is worked at a reduction of at least 50% in a temperature region of not more than a β-transus temperature and is annealed in a temperature region of not more than the β-transus temperature.

\* \* \* \* \*